(12) United States Patent
Pentyala et al.

(10) Patent No.: US 11,880,659 B2
(45) Date of Patent: Jan. 23, 2024

(54) HIERARCHICAL NATURAL LANGUAGE UNDERSTANDING SYSTEMS

(71) Applicant: Salesforce, Inc., San Francisco, CA (US)

(72) Inventors: Shiva Kumar Pentyala, Austin, TX (US); Jean-Marc Soumet, Sunnyvale, CA (US); Shashank Harinath, Mountain View, CA (US); Shilpa Bhagavath, Mountain View, CA (US); Johnson Liu, Santa Clara, CA (US); Ankit Chadha, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 260 days.

(21) Appl. No.: 17/162,318

(22) Filed: Jan. 29, 2021

(65) Prior Publication Data

US 2022/0245349 A1 Aug. 4, 2022

(51) Int. Cl.
*G06F 17/00* (2019.01)
*G06F 40/30* (2020.01)
*G06F 40/295* (2020.01)
*G06N 20/00* (2019.01)

(52) U.S. Cl.
CPC ............ *G06F 40/30* (2020.01); *G06F 40/295* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 10,469,584 B2 | 11/2019 | Chan et al. | |
| 10,824,608 B2 | 11/2020 | Yang et al. | |
| 10,853,511 B2 | 12/2020 | Szeto et al. | |
| 10,926,173 B2 * | 2/2021 | Shah | A63F 13/63 |
| 11,238,314 B2 | 2/2022 | Chadha et al. | |
| 11,347,708 B2 | 5/2022 | Chadha et al. | |
| 11,449,682 B2 * | 9/2022 | Galitsky | G06N 5/01 |
| 11,481,636 B2 * | 10/2022 | Ramachandran | G06N 3/084 |

(Continued)

OTHER PUBLICATIONS

Davison, Joe, "Zero-Shot Learning in Modern NLP", GitHub, available online at <https://joeddav.github.io/blog/2020/05/29/ZSL.html>, May 29, 2020, 6 pages.

(Continued)

*Primary Examiner* — Satwant K Singh
(74) *Attorney, Agent, or Firm* — Nicholson, De Vos, Webster & Elliott, LLP

(57) ABSTRACT

Methods and systems for hierarchical natural language understanding are described. A representation of an utterance is inputted to a first machine learning model to obtain information on the first utterance. According to the information on the utterance a determination that the representation of the utterance is to be inputted to a second machine learning model that performs a dedicated natural language task is performed. In response to determining that the representation of the utterance is to be inputted to a second machine learning model, the utterance is inputted to the second machine learning model to obtain an output of the dedicated natural language task.

20 Claims, 4 Drawing Sheets

(56) References Cited

U.S. PATENT DOCUMENTS

| | | | |
|---|---|---|---|
| 11,537,899 B2 | 12/2022 | Ramachandran et al. | |
| 2020/0068018 A1 | 2/2020 | Chan et al. | |
| 2020/0089757 A1 | 3/2020 | Ball et al. | |
| 2020/0090033 A1 | 3/2020 | Machado et al. | |
| 2020/0090034 A1 | 3/2020 | Harinath et al. | |
| 2020/0384362 A1* | 12/2020 | Shah | A63F 13/424 |
| 2021/0082425 A1* | 3/2021 | Johnson | G06N 5/04 |
| 2021/0141865 A1 | 5/2021 | Machado et al. | |
| 2021/0150340 A1 | 5/2021 | Liu et al. | |
| 2021/0202065 A1* | 7/2021 | Cummins | G16H 20/70 |
| 2021/0383913 A1* | 12/2021 | Tablan | G10L 15/26 |
| 2022/0067277 A1 | 3/2022 | Pentyala et al. | |
| 2022/0222489 A1 | 7/2022 | Liu et al. | |

OTHER PUBLICATIONS

Devlin et al., "BERT: Pre-training of Deep Bidirectional Transformers for Language Understanding", Proceedings of NAACL-HLT, May 24, 2019, 16 pages.

Oliver, Paul, "How Natural Language Inference Models "Game" the Task of Learning", Medium, available online at <https://medium.com/center-for-data-science/how-natural-language-inference-models-game-the-task-of-learning-61d2f744955c>, Apr. 19, 2018, 3 pages.

Rao et al., "Bridging the Gap Between Relevance Matching and Semantic Matching for Short Text Similarity Modeling", Proceedings of the 2019 Conference on Empirical Methods in Natural Language Processing and the 9th International Joint Conference on Natural Language Processing, Nov. 3-7, 2019, pp. 5370-5381.

Schick et al., "Exploiting Cloze Questions for Few Shot Text Classification and Natural Language Inference", GitHub, Jan. 25, 2021, 15 pages.

Schick et al., "It's Not Just Size That Matters: Small Language Models Are Also Few-Shot Learners", GitHub, Sep. 15, 2020, 11 pages.

Yang et al., "Simple and Effective Text Matching with Richer Alignment Features", Proceedings of the 57th Annual Meeting of the Association for Computational Linguistics, Jul. 28-Aug. 2, 2019, pp. 4699-4709.

\* cited by examiner

HIERARCHICAL NATURAL LANGUAGE UNDERSTANDING SYSTEMS

TECHNICAL FIELD

One or more implementations relate to the field of natural language processing; and more specifically, to a hierarchical natural language understanding system.

BACKGROUND ART

Natural language processing (NLP) is a subfield of linguistics, computer science, and artificial intelligence concerned with the interactions between computers and human language. In particular, NLP is interested in enabling computer programming to process and analyze natural language data. The result is a computer capable of "understanding" the contents of utterances (e.g., utterances present in documents, utterances received from a user such as sounds or strings of characters). NLP systems can then accurately extract information and insights contained in these utterances, categorize, organize the utterances, and/or respond to these utterances.

NLP systems use machine learning models to implement NLP applications. In existing systems, a machine learning model is typically dedicated to a single NLP task (e.g., natural language inference, named entity recognition, question-answering, paraphrasing, etc.). Further, existing machine learning models are extremely large models. These models remain impractical for real-world use, as they need large data sets for training, as well as large amounts of compute and storage resources for deployment.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
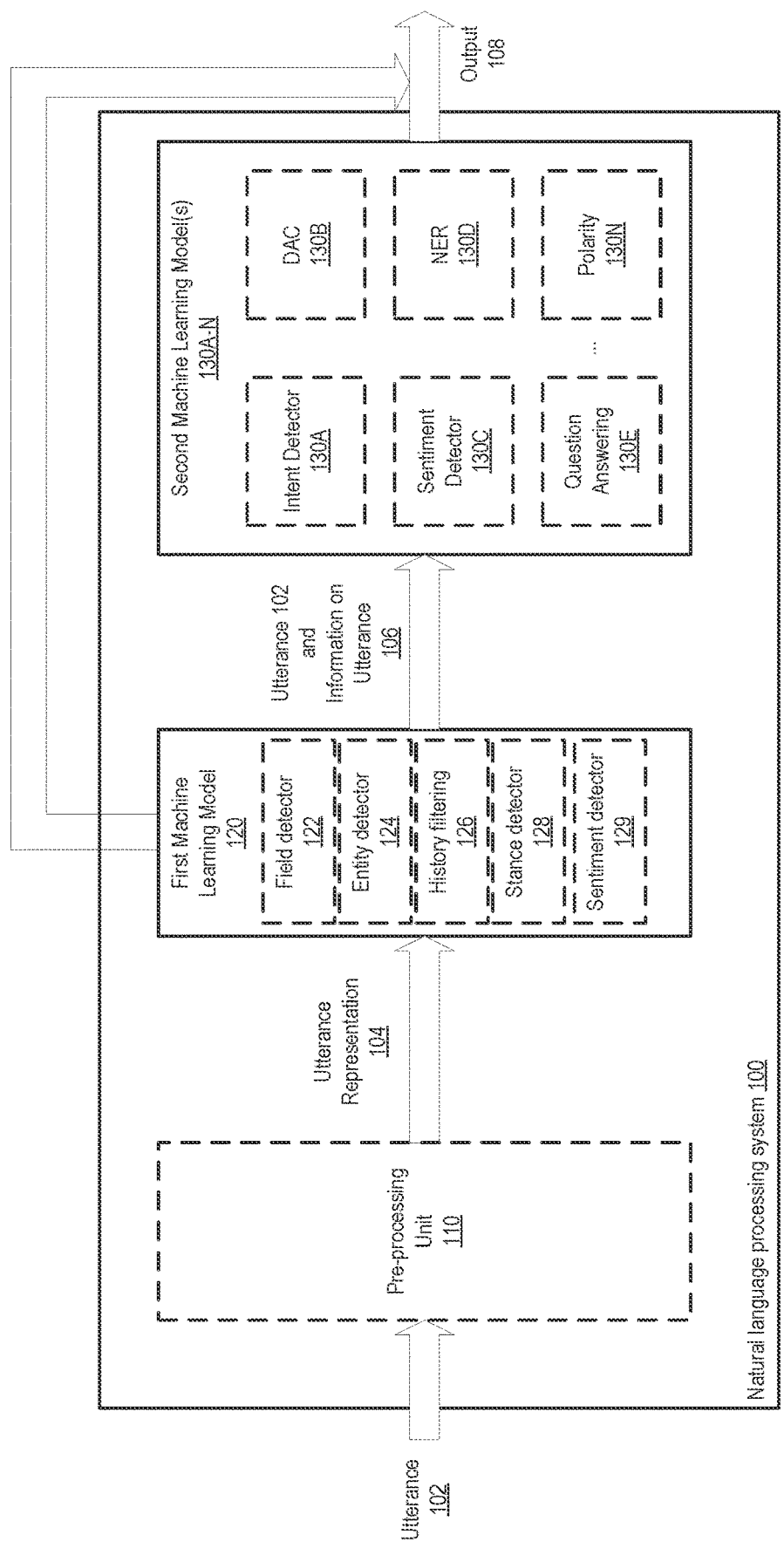
FIG. 1 is a block diagram illustrating a natural language processing system that is operative to perform multi-level utterance processing, according to some example implementations.

The following description describes methods and apparatus for hierarchical natural language understanding.

The implementations herein describe a natural language processing system that includes a two-level pipeline. The NLP system includes a first level with a first machine learning model and a second level with a second machine learning model. In some implementations, the first machine learning model is task agnostic, and the second machine learning model is task specific and/or field specific. In some implementations, the first machine learning model is lighter (in terms of memory and processing resources needed for implementing the first machine learning model), more efficient (faster). In some implementations, the first machine learning model supports CPU only processing (as opposed to needing support of dedicated processing units such as graphics processing units (GPUs) in addition to CPU processing). The second machine learning model is more specialized (e.g., defined for a particular task, or a particular field (medical, financial, etc.)), uses more compute and storage resources than the first machine learning model, and is slower than the first machine learning model. In some implementations, the second machine learning model can be implemented on GPUs and/or a combination of CPU/GPUs. The first machine learning model is used to obtain information on an utterance. In some implementations, the information can be used to determine whether to send the utterance to a second machine learning model or to bypass the second machine learning model. Additionally or alternatively, the information can be used to route the utterance to the appropriate one from multiple ones of second machine learning models, or to bypass the second machine learning models. Additionally or alternatively, the information can be used as additional input to the second machine learning models. The first model can be referred to as a student model as its lightweight, operative to perform easy tasks. The second model can be referred to as a teacher model as it is heavy, very knowledgeable as a result of being trained on much larger data.

In one implementation, a representation of the utterance is inputted to a first machine learning model to obtain information on the utterance. According to the information on the utterance a determination that the representation of the utterance is to be inputted to a second machine learning model that performs a dedicated natural language task is performed. In response to determining that the representation of the utterance is to be inputted to a second machine learning model, the utterance is inputted to the second machine learning model to obtain an output of the dedicated natural language task.

The implementations described herein provide several advantages when compared with existing NLP systems. The implementations herein describe a layered or leveled system that includes a light machine learning model and a heavier machine learning model. The first machine learning model can process utterances to obtain information on the utterance in a quick and efficient manner, without the use of extensive processing and storage resources. Based on this information, the system may determine a second machine learning model that can process the utterance or may determine that there is no need for such additional processing of the utterance. This mechanism significantly speeds up the processing of utterances in an NLP when compared to existing NLP systems that rely on dedicated heavy machine learning models for processing the utterances. Further, the first machine learning model is task agnostic. The output of the first machine learning model can be provided to the second machine learning model consequently increasing the number of clues that are provided to the second machine learning model for an utterance. This has a significant impact on the latency of the second machine learning model and its accuracy. In addition, the use of a first machine learning model allows for the selection of the appropriate second machine learning model that is to receive the utterance (e.g., a second machine learning model that is dedicated to the field of the utterance) and avoids the need of sending the utterance to multiple versions (e.g., multiple fields) or multiple types of the second machine learning model.

FIG. 1 is a block diagram illustrating a natural language processing system 100 that is operative to perform multi-level utterance processing, according to some example implementations. In some implementations, the NLP system 100 supports one or multiple language services to offer insights and information on utterances received from a user. For example, the NLP system 100 can be used to offer insight on a conversation with a user by determining what the intent of the user is in the utterance, what the sentiment of the user is, which entities if any are identified in the utterance, etc. The output of the NLP system 100 can be directly supplied to a user. Additionally or alternatively, the output of the NLP system 100 can be sent to one or more other services (e.g., a chatbot service, a cloud service, a marketing service, etc.).

The NLP system receives as input one or more utterances. An utterance is received from a user through a user interface of a user device. While implementations herein will be described with respect to the utterance being received from a user, in some implementations, the utterance can be received from another cloud service that is communicatively coupled with the NLP system 100. For example, the utterance can be received from another NLP system. The utterance can be a sound (e.g., words spoken by a user, a statement, a song, etc.), or text (e.g., a string of one or more characters) entered through a graphical user interface by the user. The user may use hardware devices such as microphone, a mouse, a keyboard, or any other I/O devices to input the utterance.

The NLP system 100 includes a first machine learning model 120 and one or more second machine learning model(s) 130A-N. In some implementations, the NLP system 100 may include one or more additional components, such as the pre-processing unit 110. The first machine learning model 120 is a light machine learning model that does not require substantive memory and/or processing resources. The first machine learning model 120 is fast and efficient at processing representations of utterances. In some implementations, the first machine learning model is task agnostic in the sense that it performs multiple natural language tasks at once. In some implementations, the first machine learning model 120 is implemented on general purpose processing units and does not need the use of specialized processing units, such as graphics processing units.

The system 100 may include one or multiple ones of the second machine learning models 130A-N. A second machine learning model can be of a predetermined type, i.e., dedicated to a particular natural language task. In some implementations, two second machine learning models can be of different types (i.e., dedicated to different NLP tasks). Additionally or alternatively, two second machine learning models can be applicable to different fields. For example, a first one of the second machine learning models 130A-N can be dedicated to applications in a medical field, and another one can be dedicated to applications in the financial fields, while both machine learning models can be of the same type, i.e., performing the same NLP task. For example, the system 100 may include a first Intent detection model 130A that is dedicated to a first field and a second intent detection model (not illustrated) that is dedicated to a second field different from the first field. In some implementations, the system may include for each natural language task two or more second machine learning models, where each model is dedicated to a particular field. The second machine learning model is more specialized (e.g., defined for a particular task, or a particular field (medical, financial, etc.)), uses more compute and storage resources than the first machine learning model, and is slower than the first machine learning model in processing utterances.

The first machine learning model 120 is operative to receive a representation of an utterance, process the representation of the utterance, and output information on the utterance. In some implementations a representation of the utterance includes a string of characters. In some implementations, a representation of the utterance may include the string of characters and additional data related to the utterance. The additional data related to the utterance can include previous utterances (e.g., chat history). For example, the representation of the utterance may include an output of the pre-processing unit 110. The first machine learning model 120 uses the representation of the utterance to obtain the information on the utterance.

In some implementations, the first machine learning model 120 includes one or multiple ones of a field detector 122, an entity detector 124, a history filtering 126, a stance detector 128, and a sentiment detector 129. The field detector 124 is operative to identify one or more fields associated with the first utterance. For example, the field detector 122 is operative to determine that the utterance is associated with the medical field, the financial field, a marketing field, an automotive field, or any other fields. The entity detector 124 is operative to identify one or more entities that may be associated with the utterance. The entity may be a user, an organization, a product, etc. For example, the utterance input from the user may include the name of the user, a name of the organization at which the user works, a name of a person that the user is trying to reach or obtain information on, a name of a product that a user has purchased or would like to obtain information on, etc. The history filtering 126 is operative to filter from a set of past utterances associated with the utterance a subset of these past utterances. For example, the history filtering 126 may identify from past utterances (previously received from a user) relevant utterances that are semantically similar to the current utterance. The stance detector 128 is operative to determine a stance of the user associated with the utterance. For example, the stance can be an opinion of the user with respect to an application, a product, a group, etc. In some implementations, the stance of a user may include whether the user agrees or disagrees with the NLP system's response to previous utterances from the user. The sentiment detector 129 is operative to determine the sentiment of the user from which the utterance is received. The first machine learning model 120 outputs the information on the utterance. The information on the utterance may include one or a combination of the field(s) associated with the utterance, an entity associated with the utterance, one or more filtered historical data associated with the utterance, a stance of a user associated with the utterance, and a sentiment of the user from which the utterance is received.

In some implementations, the information can be used to determine whether to send the utterance to a second machine learning model or whether to bypass the second machine learning model instead. Additionally or alternatively, the information can be used to route the utterance to one of multiple second machine learning models 130A-N. Additionally or alternatively, the information can be used as additional input to the second machine learning models 130A-N. Thus, in some implementations, the first machine learning model 120 provides additional data that can be used by the second machine learning models 130A-N to process an utterance more accurately and more efficiently. The first machine learning model 120 may, additionally or alternatively, act as an orchestrator to send an utterance to one of multiple second machine learning models. In some implementations, the first machine learning model 120 is a zero-shot model that is operative to observe a representation of an utterance from a class that was not observed during a training phase of the first machine learning model and is operative to predict one or more classes that the representation of the first utterance belongs to.

In some implementations, it is determined based on the information on the utterance that the second machine learning model can be bypassed. In these implementations, the output of the first machine learning model is output from the NLP system 100. Alternatively, it is determined based on the information on the utterance that the utterance is to be inputted to the second machine learning model. In these implementations, a selection of a second machine learning model from the second machine learning models can be performed. In other implementations, the utterance can be inputted to multiple ones of the second machine learning models 130A-N.

Thus, one or multiple ones of the second machine learning models 130A-N may receive a representation of the utterance and process it. In some implementations, in addition to the representation of the utterance, the second machine learning model(s) receive the information on the utterance as input. The use of the additional information enables a more accurate and more efficient prediction by the second machine learning model than if they were to receive the representation of the utterance only. The second machine learning model processes the representation of the utterance and outputs an output of a dedicated natural language processing task.

The system 100 outputs the output 108. The output 108 can be an output of the first machine learning model 120. The output 108 can be an output of the second machine learning models. In some implementations, the output of system 100 is sent to a user device. In some implementations, the output of the system 100 can be sent to another service that is operative to interact and interface with the user through the user device. For example, the output of system 100 can be sent to a component of a conversational artificial intelligence service that is used for communication with a user through the user device. The conversational artificial intelligence service can implement a chat bot application that enable a user to have a conversation with a bot. The output of the system 100 can be used to answer a question of the user, ask a question to the user, and/or provide any other information/data to the user through a user interface. In another example, the output of the dedicated natural language task can be sent to another type of service (e.g., analytics, marketing, etc.). The output of the system 100 provides insight and information on the utterance received from a user that can be used in one or more of these services.

Figure 2A:
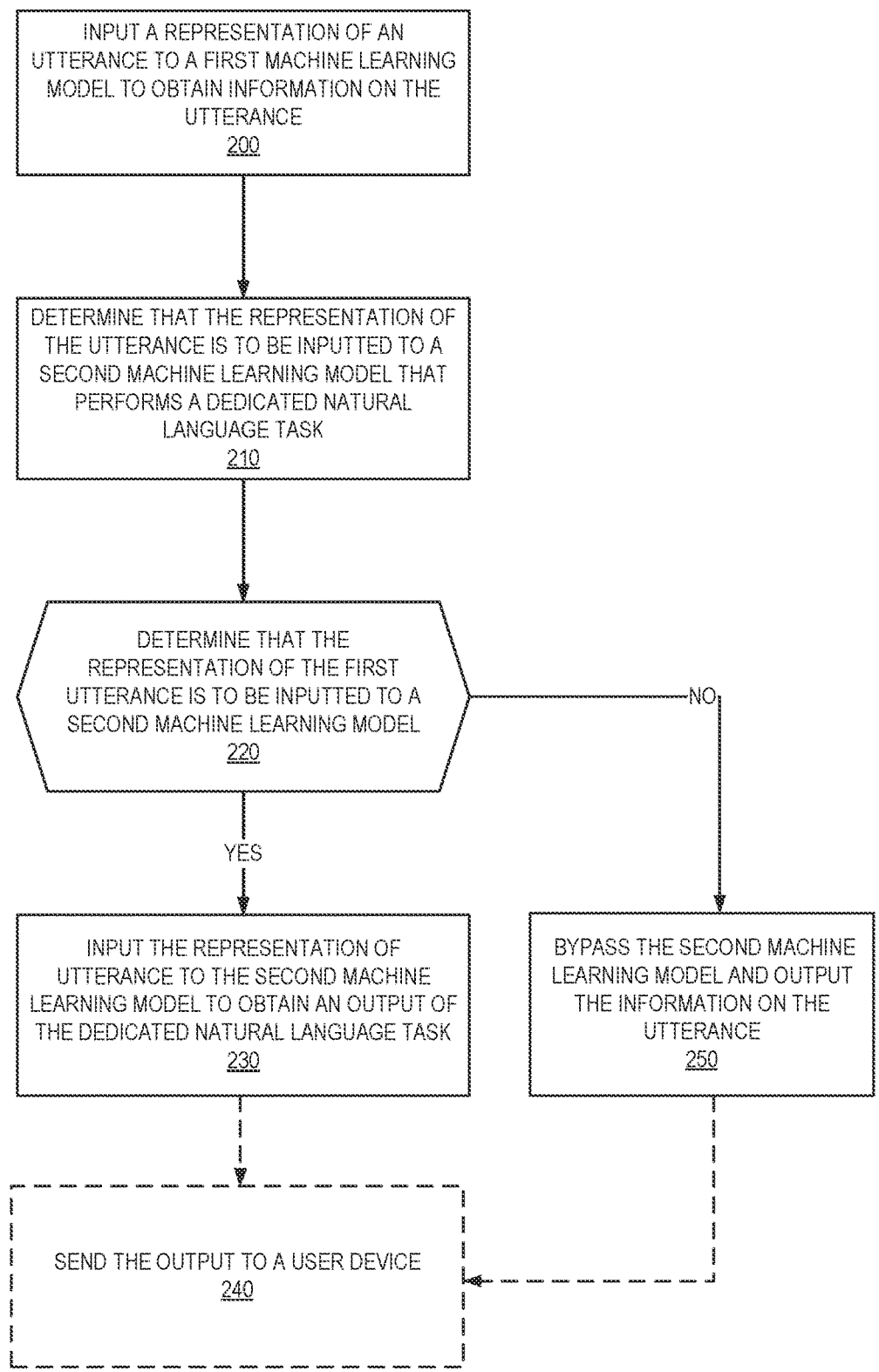
FIG. 2A is a flow diagram illustrating exemplary operations of a multi-level utterance processing in a natural language processing system, according to some example implementations.

FIG. 2A is a flow diagram illustrating exemplary operations of a multi-level utterance processing in a natural language processing system, according to some example implementations.

At operation 210, the representation of an utterance is inputted to a first machine learning model 130. The representation of the utterance is processed in the first machine learning model 130 to obtain information of the utterance. The information on the utterance includes one or a combination of a field associated with the first utterance, an entity associated with the first utterance, one or more filtered historical data associated with the first utterance, a stance of a user associated with the first utterance, and a sentiment of the user from which the utterance is received.

The flow of operations moves to operation 220. At operation 220, according to the information on the utterance, the system 100 determines whether the representation of the first utterance is to be inputted to a second machine learning model that performs a dedicated natural language task. In some implementations, determining whether the representation of the first utterance is to be inputted to the second machine learning model includes determining whether the information on the utterance is a satisfactory output of the system 100. For example, this may include determining that the information on the utterance provides sufficient information to respond to a user of a conversational intelligence artificial system that uses the system 100.

In response to determining that the representation of the utterance is to be inputted to a second machine learning model, the flow of operations moves to operation 230. At operation 230, the utterance is inputted to the second machine learning model (e.g., one or multiple ones of the second machine learning models 130A-N) to obtain an output of the dedicated natural language task. In some implementations, the dedicated natural language task is one of intent detection (e.g., 130A), named entity recognition (NER 130D), dialogue act classification (DAC 130B), and question answering (130E). In some implementations, in addition to inputting the utterance, the information on the utterance obtained from processing of the utterance in the first machine learning model is also inputted to the second machine learning model. In some implementations, the flow moves to operation 240.

In response to determining that the information on the utterance is not to be inputted to the second machine learning model, the flow of operations moves to operation 250. In some implementations, determining that the information on the utterance is not to be inputted to the second machine learning model includes determining that the information on the utterance is an output of a dedicated natural language task. At operation 250, the second machine learning model is bypassed and the information on the utterance is output. In some implementations, the flow moves to operation 240.

In some implementations, the output at operation 240 is the output of the second machine learning model. Alternatively, the output at operation 240 can be the output of the first machine learning model. At operation 240, the output of system 100 is sent to a user device. In some implementations, the output of the system 100 can be sent to another service that is operative to interact and interface with the user through the user device. For example, the output of system 100 can be sent to a component of a conversational artificial intelligence service that is used for communication with a user through the user device. The conversational artificial intelligence service can implement a chat bot application that enables a user to have a conversation with a bot. The output of the system 100 can be used to answer a question of the user, ask a question to the user, and/or provide any other information/data to the user through a user interface. In another example, the output of the dedicated natural language task can be sent to another type of service (e.g., analytics, marketing, etc.). The output of the system 100 provides insight and information on the utterance received from a user that can be used in one or more of these services.

Figure 2B:
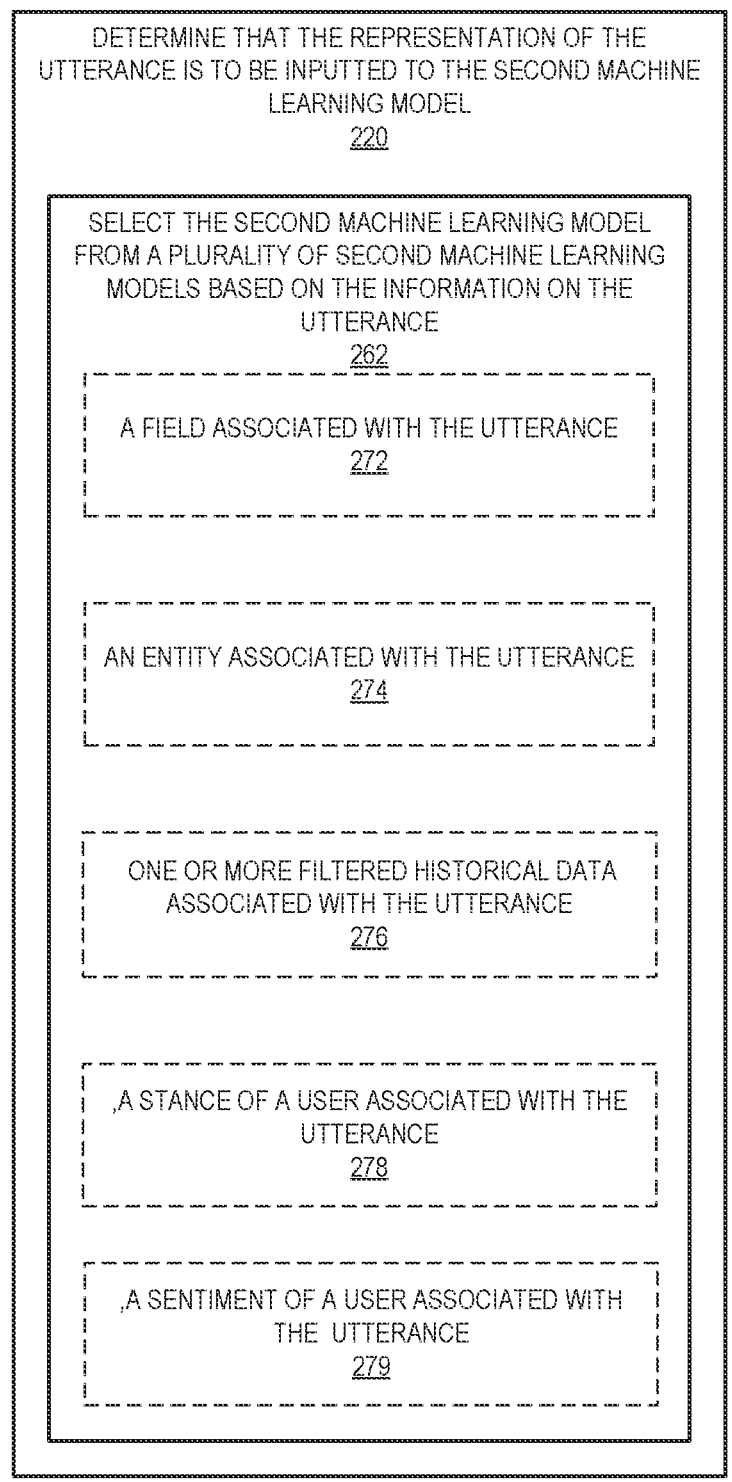
FIG. 2B illustrates a flow diagram of exemplary operations that can be performed for determining that the representation of the utterance is to be inputted to the second machine learning model, in accordance with some implementations.

FIG. 2B illustrates a flow diagram of exemplary operations that can be performed for determining that the representation of the utterance is to be inputted to the second machine learning model, in accordance with some implementations. In some implementations, determining that the representation of the utterance is to be inputted to the second machine learning model includes selecting the second machine learning model from a plurality of second machine learning model 130A-N based on the information on the utterance. The selection of the second machine learning model can be performed based on a field associated with the utterance, operation 272. Additionally or alternatively, the selection of the second machine learning model can be performed based on an entity associated with the utterance, operation 274. Additionally or alternatively, the selection of the second machine learning model can be performed based on one or more filtered historical data associated with the utterance, operation 276. Additionally or alternatively, the selection of the second machine learning model can be performed based on a stance of the user associated with the utterance, operation 278. Additionally or alternatively, the selection of the second machine learning model can be performed based on a sentiment of the user associated with the utterance, operation 279.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
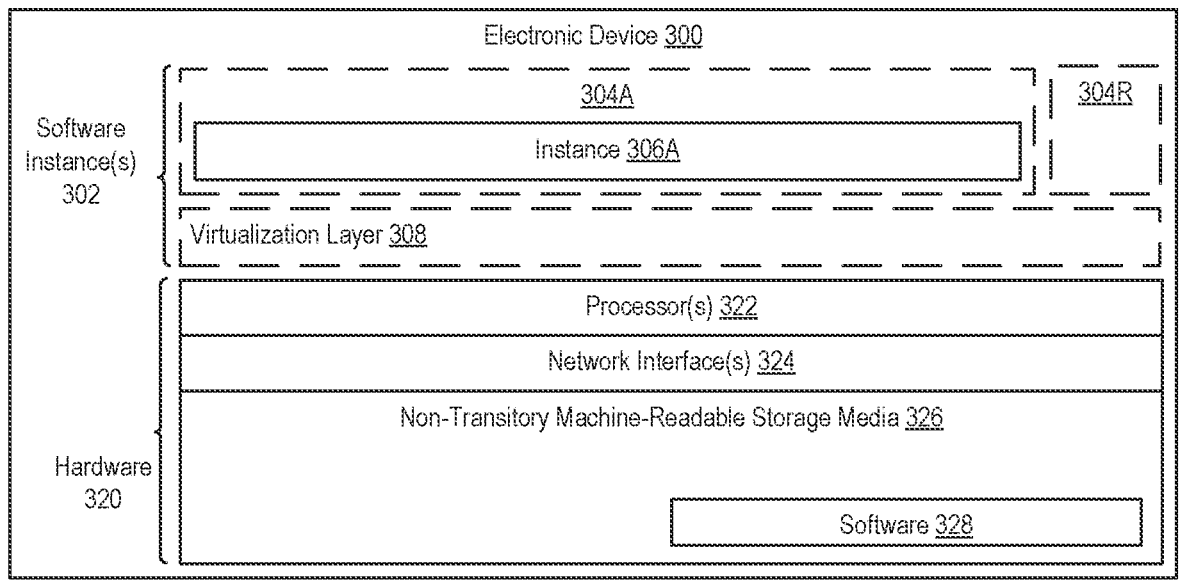
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described end user clients and the natural language processing service may be implemented in one or more electronic devices 300. In one implementation: 1) each of the end user clients is implemented in a separate one of the electronic devices 300 (e.g., in user electronic devices operated by users where the software 328 represents the software to implement end user clients to interface with the natural language processing service (e.g., a web browser, a native client, a portal, a command-line interface, and/or an application program interface (API) based upon protocols such as Simple Object Access Protocol (SOAP), Representational State Transfer (REST), etc.)); 2) the natural language processing service is implemented in a separate set of one or more of the electronic devices 300 (e.g., a set of one or more server electronic devices where the software 328 represents the software to implement the natural language processing service); and 3) in operation, the electronic devices implementing the end user clients and the natural language processing service would be communicatively coupled (e.g., by a network) and would establish between them (or through one or more other layers) connections for submitting utterances to the natural language processing service and returning outputs to the end user clients. Other configurations of electronic devices may be used in other implementations (e.g., an implementation in which the end user client and the natural language processing service are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Exemplary Environment

Figure 3B:
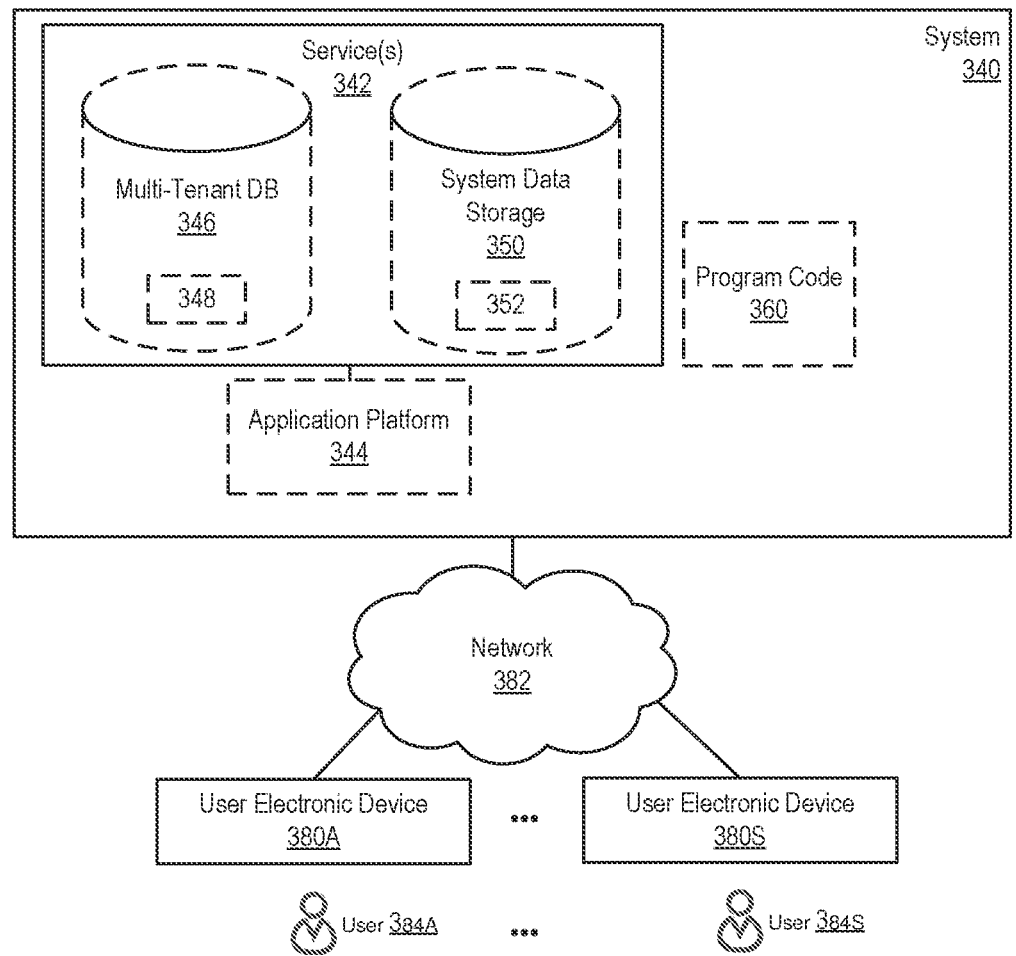
FIG. 3B is a block diagram of an environment where a natural language processing system may be deployed, according to some implementations.

FIG. 3B is a block diagram of an environment where a multi-level natural language processing system may be deployed, according to some implementations. A system 340 includes hardware (a set of one or more electronic devices) and software to provide service(s) 342, including the natural language processing service. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communication with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting one or multiple services, such as one or multiple natural language processing services such as intent detection, named entity recognition, sentiment detection which assist a conversational artificial intelligence service for communication with a user (e.g., Einstein Bot by salesforce.com, Inc.), an artificial intelligence service (e.g., Salesforce Einstein artificial intelligence (AI) by salesforce.com, Inc.), a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346 for tenant data 348, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the natural language processing service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process, and view information, pages, and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method comprising:
inputting a representation of a first utterance to a first machine learning model to obtain information on the first utterance;
according to the information on the first utterance, determining that the representation of the first utterance is to be inputted to a second machine learning model that performs a dedicated natural language task; and
in response to determining that the representation of the first utterance is to be inputted to a second machine learning model, inputting the representation of the first utterance to the second machine learning model to obtain an output of the dedicated natural language task.

2. The method of claim 1 further comprising:
inputting a representation of a second utterance to the first machine learning model to obtain information on the second utterance;
determining that the information on the second utterance is an output of a second natural language task; and
in response to determining that the information on the second utterance is the output of the second natural language task bypassing the second machine learning model.

3. The method of claim 1, wherein the dedicated natural language task is one of natural language inference, paraphrasing, named entity recognition, and question answering.

4. The method of claim 1, wherein the information on the first utterance includes one or a combination of a field associated with the first utterance, an entity associated with the first utterance, one or more filtered historical data associated with the first utterance, a stance of a user associated with the first utterance, a sentiment of the user associated with the first utterance.

5. The method of claim 4, wherein one or more of the field associated with the first utterance, the entity associated with the first utterance, the one or more filtered historical data associated with the first utterance, the stance of the user associated with the first utterance, the sentiment of the user associated with the first utterance are inputted to the second machine learning model with the representation of the first utterance to obtain the output of the dedicated natural language task.

6. The method of claim 1, wherein the first machine learning model is a zero-shot model that is operative to observe a representation of an utterance from a class that was not observed during a training phase of the first machine learning model and is operative to predict one or more classes that the representation of the first utterance belongs to.

7. The method of claim 1, wherein the first machine learning model and the second machine learning model enable a conversational artificial intelligence system for communication with a user.

8. The method of claim 1, wherein the second machine learning model is for use in a predetermined field.

9. The method of claim 1, wherein in response to determining that the representation of the first utterance is to be inputted to a second machine learning model, further inputting the information on the first utterance to the second machine learning model to obtain the output of the dedicated natural language task.

10. The method of claim 1, the determining that the representation of the first utterance is to be inputted to a second machine learning model includes:
selecting, based on the information on the first utterance, the second machine learning model from a plurality of second machine learning models.

11. A non-transitory machine-readable storage medium that provides instructions that, if executed by a processor, will cause said processor to perform operations comprising:
inputting a representation of a first utterance to a first machine learning model to obtain information on the first utterance;
according to the information on the first utterance, determining that the representation of the first utterance is to be inputted to a second machine learning model that performs a dedicated natural language task; and
in response to determining that the representation of the first utterance is to be inputted to a second machine learning model, inputting the representation of the first utterance to the second machine learning model to obtain an output of the dedicated natural language task.

12. The non-transitory machine-readable storage medium of claim 11, wherein the operations further comprise:
inputting a representation of a second utterance to the first machine learning model to obtain information on the second utterance;
determining that the information on the second utterance is an output of a second natural language task; and
in response to determining that the information on the second utterance is the output of the second natural language task bypassing the second machine learning model.

13. The non-transitory machine-readable storage medium of claim 11, wherein the dedicated natural language task is one of natural language inference, paraphrasing, named entity recognition, and question answering.

14. The non-transitory machine-readable storage medium of claim 11, wherein the information on the first utterance includes one or a combination of a field associated with the first utterance, an entity associated with the first utterance, one or more filtered historical data associated with the first utterance, a stance of a user associated with the first utterance, a sentiment of the user associated with the first utterance.

15. The non-transitory machine-readable storage medium of claim 14, wherein one or more of the field associated with the first utterance, the entity associated with the first utterance, the one or more filtered historical data associated with the first utterance, the stance of the user associated with the first utterance, the sentiment of the user associated with the first utterance, are inputted to the second machine learning model with the representation of the first utterance to obtain the output of the dedicated natural language task.

16. The non-transitory machine-readable storage medium of claim 11, wherein the first machine learning model is a zero-shot model that is operative to observe a representation of an utterance from a class that was not observed during a training phase of the first machine learning model and is operative to predict one or more classes that the representation of the first utterance belongs to.

17. The non-transitory machine-readable storage medium of claim 11, wherein the first machine learning model and the second machine learning model enable a conversational artificial intelligence system for communication with a user.

18. The non-transitory machine-readable storage medium of claim 11, wherein the second machine learning model is for use in a predetermined field.

19. The non-transitory machine-readable storage medium of claim 11, wherein in response to determining that the representation of the first utterance is to be inputted to a second machine learning model, further inputting the information on the first utterance to the second machine learning model to obtain the output of the dedicated natural language task.

20. The non-transitory machine-readable storage medium of claim 11, the determining that the representation of the first utterance is to be inputted to a second machine learning model includes:

selecting, based on the information on the first utterance, the second machine learning model from a plurality of second machine learning models.

\* \* \* \* \*